US009916584B2

United States Patent
Vayghan et al.

(10) Patent No.: US 9,916,584 B2
(45) Date of Patent: Mar. 13, 2018

(54) METHOD AND SYSTEM FOR AUTOMATIC ASSIGNMENT OF SALES OPPORTUNITIES TO HUMAN AGENTS

(75) Inventors: Jamshid Abdollahi Vayghan, North Oaks, MN (US); Philip Shilung Yu, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 994 days.

(21) Appl. No.: 12/098,237

(22) Filed: Apr. 4, 2008

(65) Prior Publication Data

US 2008/0183546 A1   Jul. 31, 2008

Related U.S. Application Data

(63) Continuation of application No. 11/080,484, filed on Mar. 16, 2005.

(51) Int. Cl.
*G06Q 10/00* (2012.01)
*G06Q 30/00* (2012.01)
*G06Q 10/06* (2012.01)
*G06Q 30/02* (2012.01)

(52) U.S. Cl.
CPC ..... *G06Q 30/00* (2013.01); *G06Q 10/063112* (2013.01); *G06Q 30/0201* (2013.01); *G06Q 30/0204* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| 5,774,868 | A | * | 6/1998 | Cragun | G06Q 30/02 705/14.1 |
| 5,930,764 | A | * | 7/1999 | Melchione | G06Q 30/02 705/35 |
| 5,963,635 | A | | 10/1999 | Szlam et al. | |
| 5,966,695 | A | * | 10/1999 | Melchione | G06Q 30/02 705/35 |
| 6,067,525 | A | * | 5/2000 | Johnson | G06Q 10/06 705/7.13 |
| 6,078,892 | A | * | 6/2000 | Anderson et al. | 705/7.33 |
| 6,453,038 | B1 | | 9/2002 | McFarlane et al. | |
| 6,704,410 | B1 | | 3/2004 | McFarlane et al. | |
| 6,859,523 | B1 | * | 2/2005 | Jilk et al. | 379/32.01 |
| 7,305,364 | B2 | * | 12/2007 | Nabe | G06Q 10/06 705/37 |
| 7,392,221 | B2 | * | 6/2008 | Nabe | G06Q 20/105 235/379 |

(Continued)

OTHER PUBLICATIONS

Khosla, Rajiv. "An online multi-agent e-sales recruitment system." Web Intelligence, 2003. WI 2003. Proceedings. IEEE/WIC International Conference on. IEEE, 2003.*

(Continued)

*Primary Examiner* — Alan S Miller
(74) *Attorney, Agent, or Firm* — Daniel P. Morris; McGinn IP Law Group, PLLC

(57) ABSTRACT

A method (and system) of assigning a sales opportunity, includes creating an assignment model based on clustering historical sales opportunities, and providing a scoring mechanism on a plurality of sales agents for automatically optimizing an assignment of at least one sales opportunity to at least one of the plurality of sales agents.

17 Claims, 6 Drawing Sheets

(56) References Cited

U.S. PATENT DOCUMENTS

| | | | |
|---|---|---|---|
| 7,472,072 B2 * | 12/2008 | Kowalchuk | G06Q 30/02 705/7.32 |
| 7,640,252 B2 * | 12/2009 | Tang | G06F 17/30398 |
| 7,698,163 B2 * | 4/2010 | Reed | G06Q 30/02 703/2 |
| 7,707,059 B2 * | 4/2010 | Reed | G06Q 10/0637 705/7.31 |
| 2001/0049622 A1 * | 12/2001 | Gozdeck et al. | 705/11 |
| 2002/0029161 A1 * | 3/2002 | Brodersen et al. | 705/9 |
| 2002/0072954 A1 * | 6/2002 | Sales | 705/10 |
| 2002/0072957 A1 * | 6/2002 | Thompson et al. | 705/10 |
| 2002/0129011 A1 * | 9/2002 | Julien | 707/3 |
| 2002/0147599 A1 * | 10/2002 | Vishnubhotla | 705/1 |
| 2002/0194050 A1 * | 12/2002 | Nabe et al. | 705/10 |
| 2003/0144873 A1 * | 7/2003 | Keshel | 705/1 |
| 2003/0182175 A1 * | 9/2003 | Buie et al. | 705/10 |
| 2004/0111310 A1 * | 6/2004 | Szlam et al. | 705/8 |
| 2004/0143484 A1 * | 7/2004 | Kapadia et al. | 705/10 |
| 2006/0184414 A1 * | 8/2006 | Pappas et al. | 705/10 |

OTHER PUBLICATIONS

Apte, C. V., et al. "Data-intensive analytics for predictive modeling." IBM Journal of Research and Development 47.1 (2003): 17-23.*

Vayghan, Jamshid Abdollahi. "Data mining for automated evaluation of sales opportunities." (2003).*

"Why Use RepLocate", http://www.replocate.com/directory/01Who.htm, May 31, 2004, pp. 1-4.

"The Web's Resource for Sales and Marketing Leaders", http://www.justsell.com/subscribe_pgo.htm, May 31, 2004, pp. 1-2.

Randolph B. Cooper, et al. "Preliminary Evidence for the Effect of Automatic Responses to Authority on Information Technology Diffusion", The Data Base for Advances in Information Systems, 2001, vol. 21, No. 3, pp. 36-50.

* cited by examiner

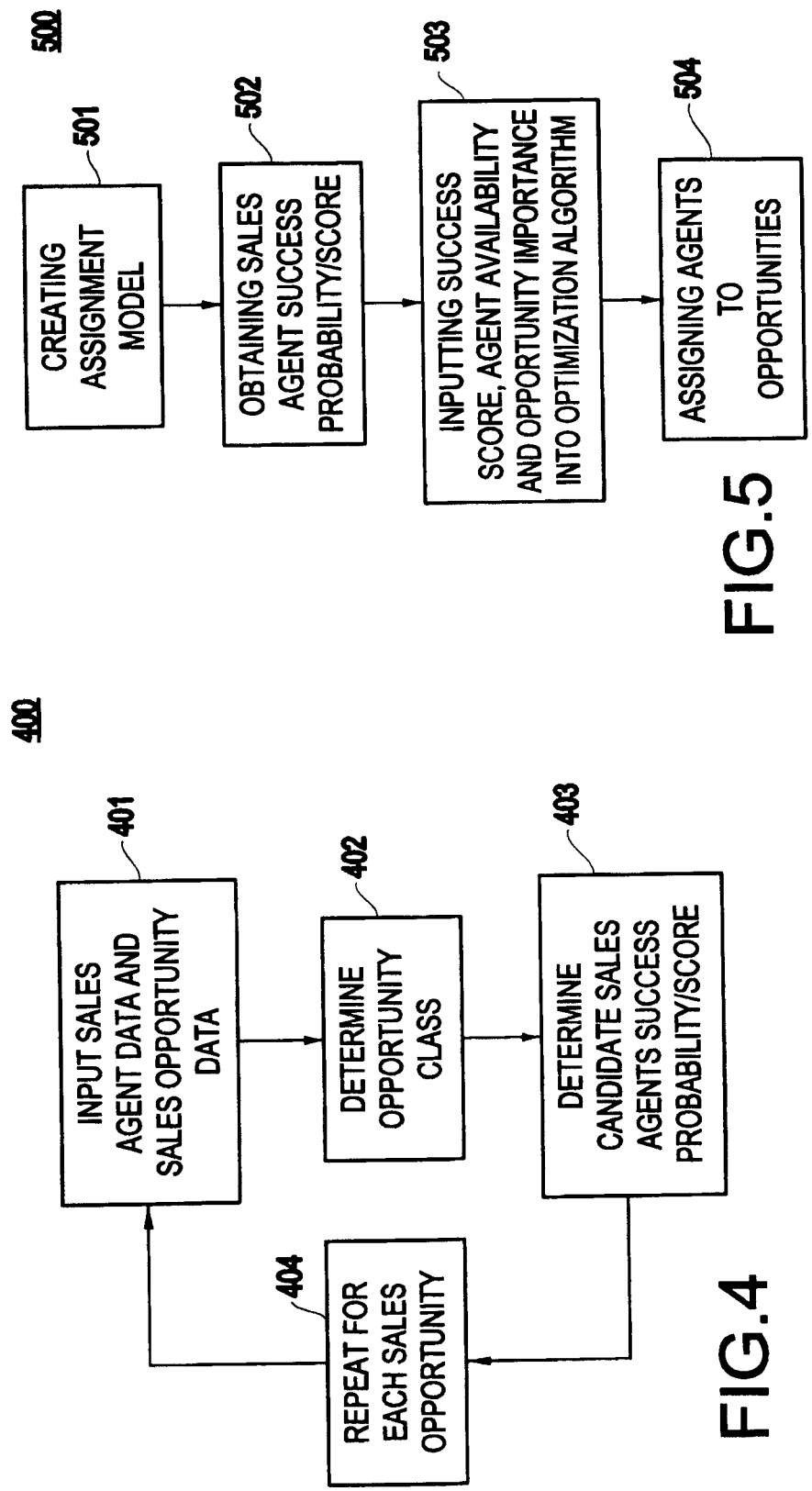

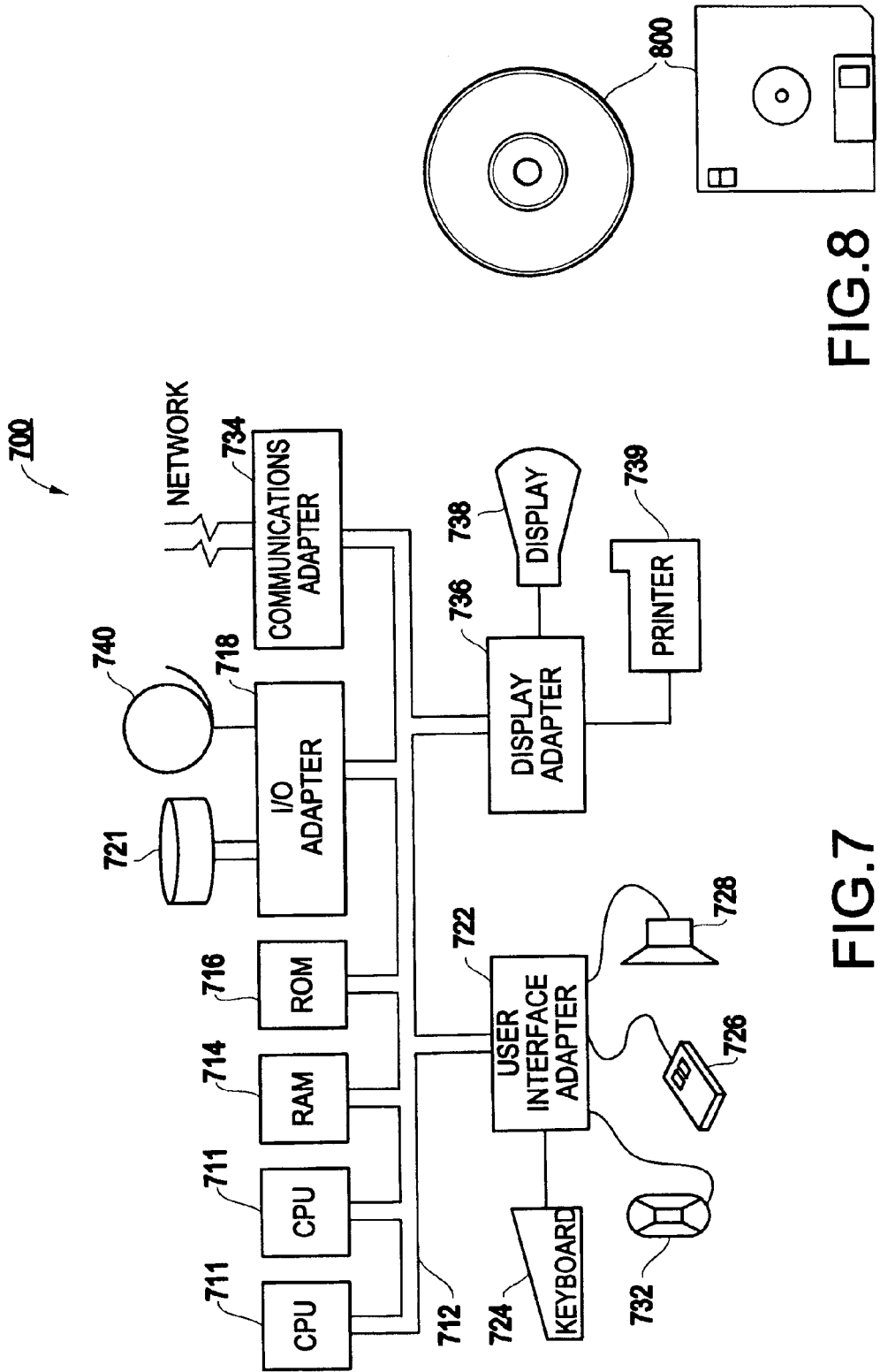

METHOD AND SYSTEM FOR AUTOMATIC ASSIGNMENT OF SALES OPPORTUNITIES TO HUMAN AGENTS

The present application is a Continuation application of U.S. patent application Ser. No. 11/080,484 filed on Mar. 16, 2005.

BACKGROUND OF THE INVENTION

Field of the Invention

The present invention generally relates to an enterprise or organization self-management tool, and more particularly to a method and system for automatically assigning a sales opportunity to a human agent by determining the success probability of a candidate sales agent for a sales opportunity.

Description of the Related Art

Conventional management tools have been developed for aiding enterprise managers in assigning agents to specific activities or opportunities. Specifically, management tools have been developed for assigning a sales opportunity to one of a plurality of available sales agents.

The conventional processes that are usually used to assign a sales opportunity to a sales agent are manual and ad-hoc processes that require human evaluations and follow-up, which is highly inefficient. The conventional processes are manual and ad-hoc in that the processes do not provide decision aid tools. That is, the managers are required to base all assignment decisions on their own personal knowledge. The conventional processes do not provide a systematic analysis of assignment data.

Furthermore, the conventional methods do not provide a means for utilizing historical data to determine the most efficient assignment of sales opportunities to sales agents. Because the managers make all of the assignment decisions based on their own knowledge, when the manager leaves a new manager does not have access to the information relied upon for the assignment decisions. The new manager is forced to make all of the assignment decisions based only on information provided to the manager at that time.

Furthermore, the most commonly used ad-hoc and inefficient assignment processes can result in assignment of sales opportunities to the wrong human agents. A wrong human agent can lose a good opportunity while a good human agent can win a mediocre sales opportunity. The conventional methods and systems do not provide a means for optimizing the assignment of the sales opportunities to sales agents so that the most important sales opportunities are assigned to the most qualified, available agents.

Furthermore, the conventional methods and systems can also result in assigning a less valuable task to an over-qualified agent so that the agent cannot be assigned to handle more valuable sales opportunities later on. Identifying the requirement of a sales opportunity and then matching it with the appropriate salesman or salesman characteristic are very challenging tasks.

SUMMARY OF THE INVENTION

In view of the foregoing and other exemplary problems, drawbacks, and disadvantages of the conventional methods and structures, an exemplary feature of the present invention is to provide a method and structure in which a success probability of an agent for completing a sales opportunity is automatically provided to an enterprise manager to optimize the assignment of sales opportunities to sales agents.

It is another exemplary feature to provide a method and system that allows a user to carry-over or transfer previous expertise and knowledge when assigning sales opportunities to sales agents.

It is another exemplary feature to provide a method and system that is self-adaptive so that if the data inputted into the method and system changes, the model created by the method and system does not need to be changed.

To achieve the above and other features, in a first exemplary aspect of the present invention, a method (and system) of assigning a sales opportunity, includes creating an assignment model based on clustering historical sales opportunities, and providing a scoring mechanism on a plurality of sales agents for automatically optimizing an assignment of at least one sales opportunity to at least one of the plurality of sales agents.

In a second exemplary aspect of the present invention, a computer system for assigning a sales opportunity, includes means for creating an assignment model and means for applying the assignment model to a data set for automatically optimizing the assignment of the sales opportunity to a sales agent.

In a third exemplary aspect of the present invention, a computer system for assigning a sales opportunity, includes a creating unit for creating an assignment model based on clustering historical sales opportunities, and providing a scoring mechanism on a plurality of sales agents for automatically optimizing an assignment of at least one sales opportunity to at least one of the plurality of sales agents.

In a fourth exemplary aspect of the present invention, a signal-bearing medium tangibly embodies a program of machine readable instructions executable by a digital processing apparatus to perform a method of assigning a sales opportunity, where the method includes creating an assignment model based on clustering historical sales opportunities, and providing a scoring mechanism on a plurality of sales agents for automatically optimizing an assignment of at least one sales opportunity to at least one of the plurality of sales agents.

In a fifth exemplary aspect of the present invention, a method of deploying computing infrastructure, includes integrating computer-readable code into a computing system, wherein the computer readable code in combination with the computing system is capable of performing a method of assigning a sales opportunity, where the method of assigning a sales opportunity, includes creating an assignment model based on clustering historical sales opportunities, and providing a scoring mechanism on a plurality of sales agents for automatically optimizing an assignment of at least one sales opportunity to at least one of the plurality of sales agents.

In a sixth exemplary aspect of the present invention, a method of creating an assignment model for assigning an opportunity to an agent, includes creating at least one opportunity class by clustering historical opportunity data, and training a classifier for each of the at least one opportunity class.

In a seventh exemplary aspect of the present invention, a method of assigning an opportunity to an agent, includes creating an assignment model including at least one opportunity class, comparing a characteristic of the opportunity with a characteristic of each of the at least one opportunity class to match the opportunity to an opportunity class having a similar characteristic, determining a success probability of the agent using the assignment model, and assigning the agent to the opportunity.

The present invention provides a method (and system) for automatic assignment of a sales opportunity to a human agent. The method of the present invention determines the success probability of a candidate sales agent for a sales opportunity. The success probability, agent availability, and importance of the sales opportunity are used to assign the sales opportunity to a sales agent.

The present invention creates an assignment model by first, generating a small number of opportunity classes. Each opportunity class represents a special group of sales opportunities, sharing similar characteristics (or features). The classes are created by clustering historical sales opportunities data after they have gone through feature identification and selection. Then, for each opportunity class, a classifier (or assignment model) is trained. The historical sales success/failure data for opportunities is used to predict the sales agent's success probability on that class of opportunity.

The trained assignment model is used to assign new opportunities to sales agents by first, determining an appropriate opportunity class for the new sales opportunity by matching the sales opportunity with the nearest cluster class based on the features of the new opportunity. An appropriate similarity matrix is used to identify the nearest cluster for the opportunity. Next, the candidate sales agent's success probability or score is determined using the assignment model for the corresponding opportunity class. Then, the sales agent is assigned to a sales opportunity based on success probability (or score), agent availability, and importance of the opportunity.

The present method addresses the shortcomings of the conventional methods by formalizing and automating the assignment of a sales opportunity to a sales agent. The present method improves the efficiency of an organization or enterprise, which can potentially increase the benefit from sales opportunities that an enterprise can gain.

With the above and other unique and unobvious exemplary aspects of the present invention, it is possible to optimize the assignment of sales opportunities to sales agents.

Additionally, the method (and system) of the present invention can be applied to other types of personnel assignment including, but not limited to, dispatching service personnel to handle customer calls or on-site repairs, etc.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 4 illustrates an exemplary flow chart of a method 400 for using an assignment model for assigning a sales opportunity to a sales agent of the present invention;

FIG. 5 illustrates an exemplary flow chart of a method 500 for assigning a sales opportunity to a sales agent of the present invention;

FIG. 7 illustrates an exemplary hardware/information handling system 700 for incorporating the present invention therein; and FIG. 8 illustrates a signal-bearing medium 800 (e.g., storage medium) for storing steps of a program of a method of the present invention.

DETAILED DESCRIPTION OF EXEMPLARY EMBODIMENTS OF THE INVENTION

Figure 1:
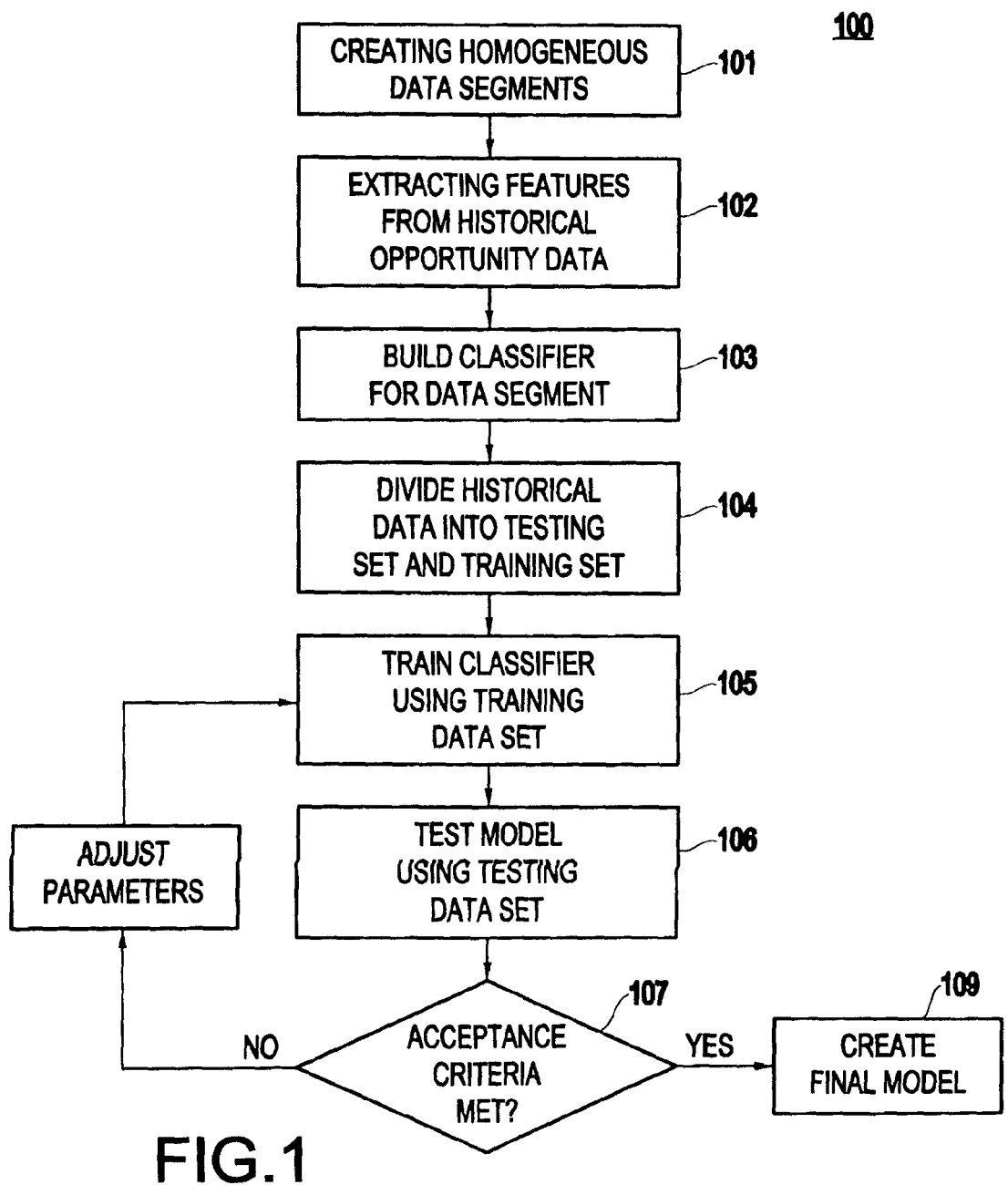
FIG. 1 illustrates an exemplary flow chart of a method 100 for creating an assignment model for assigning a sales opportunity to a sales agent of the present invention.

Referring now to the drawings, and more particularly to FIGS. 1-8, there are shown exemplary embodiments of the method and structures according to the present invention.

The method (and system) of assigning a sales opportunity to a sales agent according to the present invention uses historical data to develop an assignment model that predicts how a sales agent should perform in certain sales situations. The method of the present invention is not limited to assigning a sales opportunity to a sales agent, and may be incorporated into any management situation for assigning assignments, tasks, etc. to an employee or other agent, such as assignment of agents to customers or accounts in an insurance or fund management business.

The assignment model is constructed using the following steps. First, a small number of opportunity classes are created. Each class represents a special group of sales opportunities. The classes are created by clustering historical sales opportunities data after they have gone through feature identification and selection. Then, for each opportunity class, a classifier is trained. The historical sales success/failure data for opportunities is used to predict the agent's success probability on that class of opportunity.

The trained assignment model is used to assign new opportunities to sales agents using the following steps. First, an opportunity class is determined by matching an opportunity with the nearest cluster class based on the features of the new opportunity. An appropriate similarity measure is used to identify the most similar cluster for the opportunity. Similarity measure is a distance function that takes 2 inputs and returns as an output a similarity measure between them. Typically, a return value of zero means no similarity and one mean a complete match. The definitions of distance functions usually vary based on the type of attributes (e.g. Boolean, categorical, ordinal). Examples of distance functions include, but at not limited to, Hamming distance, Euclidean distance, and Mahalanobis distance.

Next, the candidate sales agent's success probability or score is determined using the classifier for the corresponding opportunity class. Then, the sales opportunity is assigned to a sales agent based on success probability/score, agent availability, and importance of the opportunity.

FIG. 1 illustrates a sales opportunity assignment method 100 according to an exemplary embodiment of the present invention. Historical opportunity data is obtained from a historical opportunity database. The historical data may include sales opportunity information, sales agent information and the engagement results (i.e., whether the sales agent succeeded or failed in a certain past opportunity). Specifically, historical data includes information summarizing the past performance of one or more agents in specific past sales opportunities. That is, the historical data summarizes each of the sale opportunities in which each of the sales agents has succeeded and failed.

The historical data, however, may not be homogeneous and may include items, which require a different type of handling. For example, selling software products can be different than selling hardware products. Therefore, a data set that includes opportunity data for hardware and software is not considered as homogeneous data. In that case, the data set is segmented to create homogeneous data sets. Each homogeneous data set is treated separately (step 101).

In each data set, techniques such as correlation analysis is used to identify data attributes (also known as features) which their values are correlated to the outcome of opportunities (step 102). Data features may include characteristics that are representative of each of the past sales opportunities. For example, the data features may include product characteristics and client characteristics. In the case of product characteristics, the data features describe the type of products that each of the sales agents has sold. In an exemplary case of a car salesman, the product characteristics may include the size of the automobile, the type of automobile (e.g., car, truck, minivan, etc.) and the price range of the automobile. The client characteristics may include the sex of the client (male or female), the age of the client, the size of the client, and the geographic location of the client.

The method of the present invention is not limited to a certain data mining technique, and any appropriate data mining technique may be used to build the predictive model, such as neural networks and decision trees.

Figure 2:
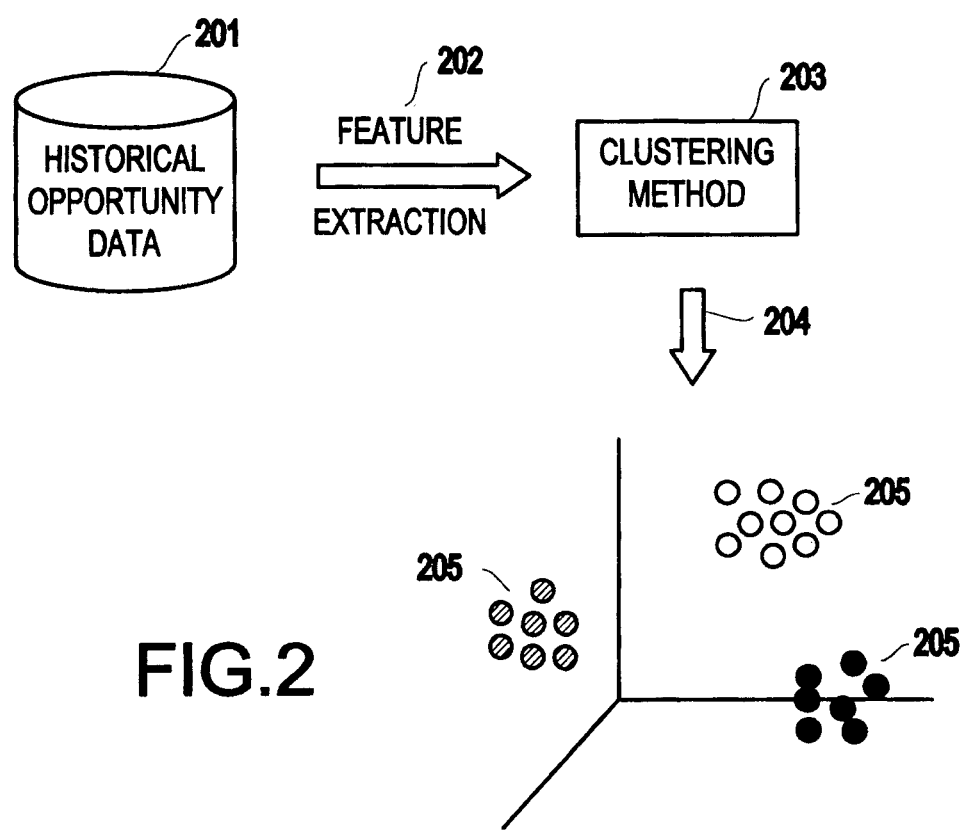
FIG. 2 illustrates an exemplary method 200 for segmenting data into homogeneous clusters in the method 100 for creating an assignment model of the present invention.

FIG. 2 further illustrates the feature extraction (step 102) and data clustering (step 101). As stated above, features of the historical data are extracted 202 from the historical opportunity database 201. A data mining-based clustering method 203 is used to divide data into data clusters 205. The clustering method uses a specific similarity measure to build clusters (204) by maximizing intracluster distance and minimizing intercluster distance. For purposes of the present invention, a specific similarity measure is a characteristic that is similar to each of the historical data in a data cluster (segment). The specific similarity measure is also used by the clustering method to define each cluster. For example, all opportunities for a certain type of software product will fall into the same cluster in step 101.

As stated above, the specific similarity measure can include one of the type of product being sold and the type of client purchasing the product. For instance, in the case of a sales opportunity for an enterprise who sells hardware offerings, software offerings and service offerings, the clusters may contain data for each offering group.

Next, referring back to FIG. 1, the historical data clusters are used to build classifiers for each type of sales opportunity (step 103). A classifier is a system that has a built-in algorithm that is based on techniques such as decision trees or neural networks. The algorithm is built using historical data for which the opportunity outcome (also known as class label) is already known. A classifier is used to predicate the class label for the new and unseen opportunities for which the outcome is not known. Each classifier will be used to find the optimal assignment of opportunities to agents.

Figure 3:
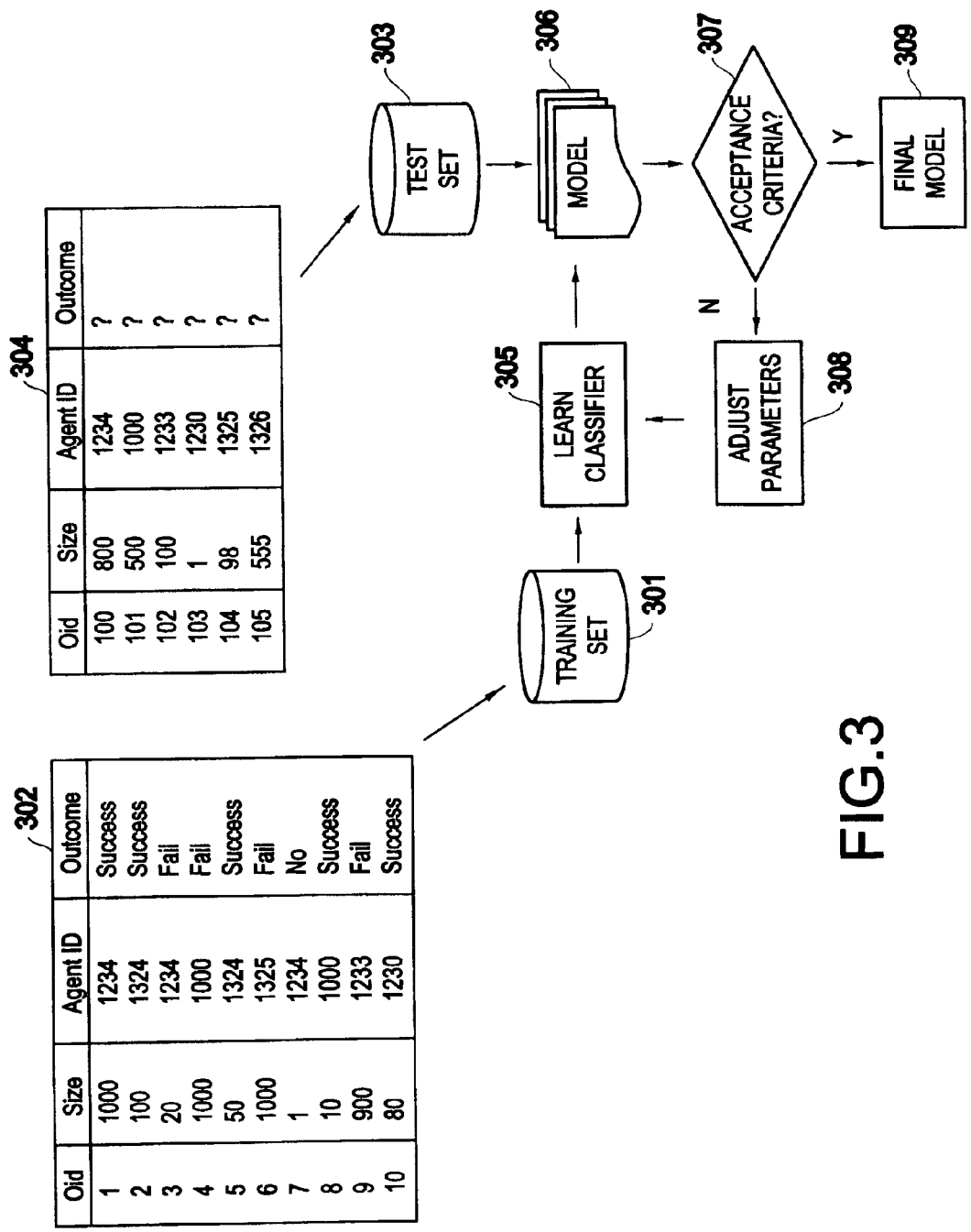
FIG. 3 illustrates a method 300 for training a classification model from historical data in the method 100 for creating an assignment model of the present invention.

The historical data is divided into a training data set and a testing data set (step 104). The historical data is divided into the two sets, training and testing, randomly to ensure that the trained model will not be biased to certain data values. Each set of data includes historical sales data. As shown in FIG. 3, each of the training data set 302 and the testing data set 304 include an opportunity identifier (Oid), the size of the opportunity (e.g., monetary amount/value), a sales agent identifier (agent ID) and a class label (outcome). The class label, or outcome, includes whether the sales opportunity was a success or a failure.

Next, a classification model (classifier) is trained (step 105) using one of the well known data mining techniques such as decision trees, and neural networks.

As shown in FIG. 3, a training data set 301, which includes the data depicted in table 302, is inputted into the classifier 305 and is used to train the classifier. The data mining technique groups data clusters based on the class labels, which trains the classifier to understand the historical data. The classifier determines a correlation between the Oid, size and agent ID provided in the data and the outcome (class label). By determining a correlation between the characteristics of each sales opportunity and the outcome of that sales opportunity, the classifier is trained to understand which type of sales opportunity situations in which a particular agent should have been successful and which have been a failure. Once the classifier is trained, an initial assignment model 306 is generated.

Then, the initial assignment model is tested (step 106) using the test data set to determine the accuracy of the model. The trained initial assignment model 306 is tested using the test data set 303 for which the class labels are known to the user, but not known to the initial assignment model 306.

As shown in FIG. 3, the test data set, including the data depicted in table 304, is inputted into the initial assignment model 306. The test data set 303 includes the same type of data as that included in the training data set. However, the class label or outcome for each of the sales opportunities is not inputted into the model 306. That is, the class label is not inputted into the model 306 so that the user may test whether the model 306 will generate the correct outcome.

Once the test data set 303 is inputted into the model 306, the model 306 is used to predict the outcome for each situation provided in the test data set 303. Because the outcome of the historical data in the test data set 303 is known to the user, the accuracy of the initial assignment model can be determined by comparing the outcomes predicted by the model and the actual historical outcomes.

Then, as depicted in FIGS. 1 and 3, the method 100 of the present invention judges the accuracy of the outcomes predicted by the initial assignment model 306 by comparing the predicted outcomes with the actual, known historical outcomes, and determines if certain acceptance criteria are met (step 107, 307). If the acceptance criteria, which may include prediction accuracy and/or comprehensibility of the model are reached, then the trained initial assignment model 306 will be used as a final assignment model 309 to assign new sales opportunities (step 109).

If, however, the acceptance criteria is not met by the initial assignment model 306, the features and the model parameters (e.g. weight assigned to each attribute in data 302, cost function, decision tree depth, etc.) are adjusted (step 108, 308) and a new model is trained.

The final model 309 is used to predict and identify an appropriate sales agent for each sales opportunity.

FIG. 400 illustrates a method of using the final assignment model 309 according to an exemplary embodiment of the present invention.

First, sales agent data (such as that included in data 302) and sales opportunity data (such as the outcome of step 101) are inputted into the model 309 (step 401).

Then, the opportunity class for the sales opportunity is determined by comparing the characteristics of the sales opportunity with the characteristics of each of the data clusters to match (optionally) the sales opportunity with the data cluster having the most similar characteristics (step 402). That is, the sales opportunity is matched to a specific data cluster by comparing the characteristics of the sales opportunity to the similarity measure of the data clusters.

Next, a candidate sales agent success probability (score) is determined for each sales agent (step 403). The sales agent score predicts the probability of success for each sales agent if the sales agent were assigned to the specific sales opportunity. The assignment will be characterized by a score ranging between 0 and 1 (1 may show the best match and 0 may show the worst match; obviously other scoring ranges may be used). Most classification algorithms used to train the model, such as decision trees, provide information that can be used to understand why a certain score was assigned. Such information includes an explicit description of why a certain item was assigned to a certain class.

This process 400 is then repeated for each sales opportunity until the assignment model 309 provides a score for each sales agent corresponding to each of the sales opportunities.

FIG. 5 illustrates a method 500 according to an exemplary embodiment of the present invention for optimizing the assignment of a sales opportunity to a sales agent.

First, an assignment model is created using the method described in FIGS. 1-3 (step 501).

Then, a sales agent success probability or score is obtained for each sales agent for each of the sales opportunities using the method described in FIG. 4 (step 502). Next, each sales opportunity is assigned to an agent by management. The present method 500 aids the management in optimizing the assignment of the sales opportunities to the sales agents.

The score obtained from the assignment model (in step 502), the availability of each agent (i.e., whether the agent's current schedule would allow the agent to accept the sales opportunity), and the importance of the opportunity are inputted into an optimization algorithm (step 503). The following optimization algorithm is used to optimize the assignment of the sales opportunities.

$A(i, j)$: is denoted as an assignment variable to be solved by the optimization problem, where $A(i, j)$ is equal to 1 if the opportunity i is assigned to sales agent j. The following parameters are input into the algorithm:

$S(i, j)$=score of assigning opportunity i to person j (obtained from assignment model);

$T(i)$=time requirement of opportunity i on a person (it can vary from 0 to 1, where 1 means 100% of a person's time);

$R(i)$=size (return) of opportunity i; and $P(j)$:=availability of person j (it can vary from 0 to 1).

The score ($S(i,j)$) is automatically inputted into the algorithm from the assignment model, whereas the time requirement ($T(i,j)$), the size ($R(i)$) and the availability ($P(i,j)$) must be inputted into the algorithm by the manager. The objective function to be maximized is defined as $O = \Sigma\ i,j\ S(i, j)\ A(i, j)\ R(i)$ which is subject to the following constraints:

$\Sigma\ j\ A(i, j) \leq 1$ for each opportunity i (i.e., an opportunity is assigned to at most one person); and $\Sigma\ i\ T(i)\ A(i, j) \leq P(j)$ for each person j (i.e., each person cannot be overloaded).

The weight of the input parameters may be adjusted for specific sales opportunities. That is, for more important opportunities (i.e. must win), the success score is a more critical factor than the availability factor, so the weight of the success will be adjusted so that the success score carries more weight. Hence, for example, the objective function, $O = \Sigma\ i,j\ S(i,j)\ A(i,j)\ R(i)$ can be changed into $O = \Sigma\ i,j\ S(i,j)\ A(i,j)\ R(i)\ w(i)$, where $w(i)$ is the weight. The normal weight to an opportunity is one. By assigning a weight of 2 to an opportunity is equivalent to saying that this opportunity has the same importance as another one with weight one but twice the size of the return of this opportunity. Less important opportunities may be assigned to a person with the most availability, as long as the success rate is reasonable.

The optimization algorithm provides the manager with a results output providing the most optimal assignment of each sales opportunity to each sales agent.

From this data, the manager then assigns each sales opportunity to a sales agent (step 504). The most qualified, available agent is assigned to the most important sales opportunity first. An opportunity from a strategic customer that company cannot afford to lose is an example of a "most important opportunity" (i.e., a must win opportunity). For purposes of the present invention, "most qualified agent" refers to the sales agent having the highest probability of succeeding in a specific sales opportunity based on the sales agent's past performance.

Figure 6:
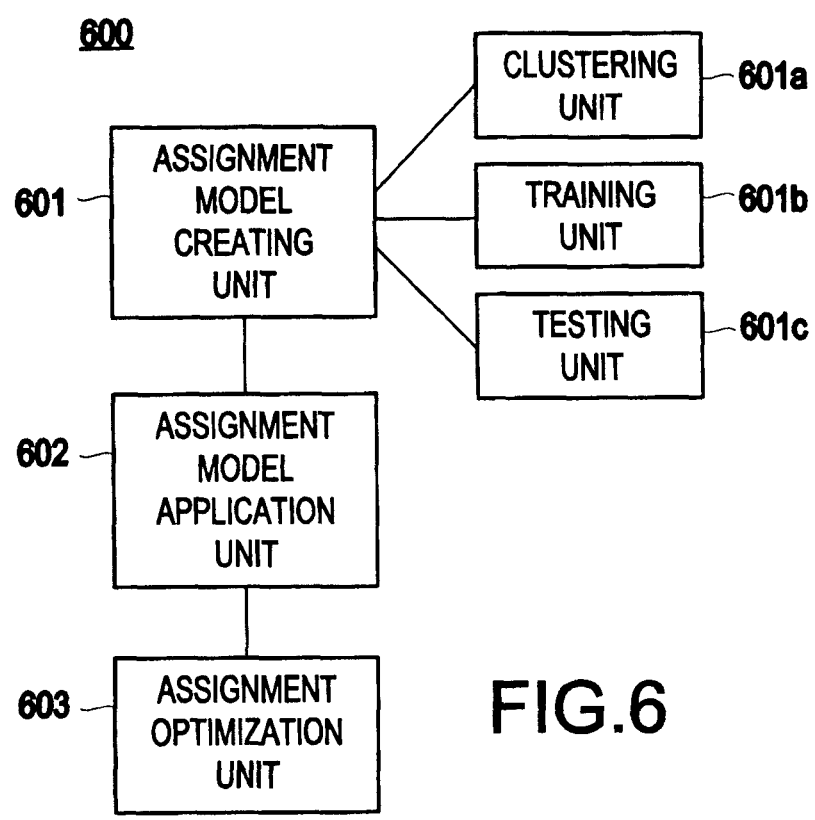
FIG. 6 illustrates an exemplary computer system 600 of assigning a sales opportunity to a sales agent of the present invention.

According to another exemplary embodiment of the present invention, a computer system 600 is provided for automatically optimizing the assignment of a sales opportunity to a sales agent (see FIG. 6). The computer system 600 includes an assignment model creating unit 601 for generating the assignment model, an assignment model application unit 602 for predicting the success score for each sales agent and an assignment optimization unit 603 for assigning each sales opportunity to a sales agent.

The assignment model creating unit 601 includes a clustering unit 601a, a training unit 601b and a testing unit 601c.

The clustering unit 601a divides the inputted historical data into clustered segments based on a similarity measure. The training unit 601b, using a data mining technique and a set of training data, trains a classifier to generate an initial assignment model. The testing unit 601c, using a set of testing data, tests the accuracy of the initial assignment model to generate a final assignment model, which is used by the assignment model application unit 602 and the assignment optimization model 603.

FIG. 7 shows a typical hardware configuration of an information handling/computer system in accordance with the invention that preferably has at least one processor or central processing unit (CPU) 711. The CPUs 711 are interconnected via a system bus 712 to a random access memory (RAM) 714, read-only memory (ROM) 716, input/output adapter (I/O) 718 (for connecting peripheral devices such as disk units 721 and tape drives 740 to the bus 712), user interface adapter 722 (for connecting a keyboard 724, mouse 726, speaker 728, microphone 732, and/or other user interface devices to the bus 712), communication adapter 734 (for connecting an information handling system to a data processing network, the Internet, an Intranet, a personal area network (PAN), etc.), and a display adapter 738 for connecting the bus 712 to a display device 738 and/or printer 739 (e.g., a digital printer or the like).

As shown in FIG. 7, in addition to the hardware and process environment described above, a different aspect of the invention includes a computer implemented method of performing the inventive method. As an example, this method may be implemented in the particular hardware environment discussed above.

Such a method may be implemented, for example, by operating a computer, as embodied by a digital data processing apparatus to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the present invention.

This signal-bearing media may include, for example, a RAM (not shown) contained with the CPU 711, as represented by the fast-access storage, for example. Alternatively, the instructions may be contained in another signal-bearing media, such as a magnetic data storage diskette or CD disk 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), or other suitable signal-bearing media including transmission media such as digital and analog and communication links and wireless. In an illustrative embodiment of the invention, the machine-readable instructions may comprise software object code, compiled from a language such as "C", etc.

Additionally, it should also be obvious to one of skill in the art that the instructions for the technique described herein can be downloaded through a network interface from a remote storage facility or server.

As evident from above, the present method (and system) addresses the shortcomings of the conventional management aid tools by formulating a method that automatically optimizes the assignment of a sales opportunity to one of at least one sales agent.

That is, the present invention determines the most suitable sales agent from a pool of candidate sales agents to handle a specific sales opportunity by predicting a likelihood of success that the agent will be successful in the particular sales opportunity.

Another benefit of the present invention is that it allows a user to carry-over or transfer previous expertise and knowledge when assigning sales opportunities to a sales agent.

Yet another benefit of the present inventive method and system is that it is self-adaptive so that if the type of data input into the method and system changes, the model created by the method and system does not need to be altered accordingly.

While the invention has been described in terms of several exemplary embodiments, those skilled in the art will recognize that the invention can be practiced with modification within the spirit and scope of the appended claims.

Further, it is noted that, Applicants' intent is to encompass equivalents of all claim elements, even if amended later during prosecution.

What is claimed is:

1. A computer-implemented prediction method, comprising:
    obtaining historical based data for a prediction element by a computer including a processor;
    creating, by the computer, an assignment model for prediction, configured on the computer, based on clustering the historical based data for the prediction event, said clustering comprising segregating the historical based data for the prediction event to create homogenous data sets for each of a plurality of agents for the event;
    providing, by the computer, a scoring mechanism on said plurality of agents for automatically optimizing an assignment of at least one prediction event to at least one of said plurality of agents, said scoring mechanism comprising a success probability for each of the plurality of agents with respect to each of the at least one prediction event;
    matching, by the computer, a new prediction event with one of said clusters;
    assigning, by the computer, a result of an agent to said new prediction event based on said scoring mechanism; and
    displaying on a display device the result,
    wherein said creating an assignment model further comprises:
        building a classifier for each of said homogeneous data segments, and
        dividing said historical data into a training data set and a testing data set,
    wherein said training data set is used to train said classifier to create an initial assignment model,
    wherein said testing data set is used to test said initial assignment model to create said assignment model, and
    wherein the assignment model for prediction is self-adaptive.

2. The method according to claim 1, further comprising:
    applying said assignment model to the at least one prediction event and the at least one agent for the event to obtain an agent success probability for resulting in a success result of obtaining the event.

3. The method according to claim 2, further comprising:
    inputting said agent success probability, an agent availability parameter and an opportunity importance measure into an optimization algorithm to determine a most appropriate agent for each said at least one prediction event.

4. The method according to claim 3, wherein a most important prediction event of said at least one prediction event is assigned to a most qualified agent of said at least one agent for the prediction event.

5. The method according to claim 1, wherein said creating an assignment model comprises:
    extracting features from a set of historical data for prediction.

6. The method according to claim 1,
    wherein data in each of said homogeneous data segments shares a predetermined characteristic,
    wherein the providing of the scoring mechanism on said plurality of agents provides a prediction and identification of an appropriate agent from among the plurality of agents for each one of a plurality of prediction events,
    wherein the historical data for the prediction event is divided into a training data set and a testing data set to randomly avoid biasing to certain data values, and
    wherein the assignment model for prediction is compared with known historical results to finalize the assignment model.

7. The method according to claim 1, further comprising creating at least two assignment models, including the initial assignment model from training data extracted from said historical data, and said assignment model created from the test data extracted from said historical data.

8. The method according to claim 7, wherein the initial assignment model is tested using the test data set to determine the accuracy of the initial assignment model, and
wherein a trained version of the initial assignment model is tested using the test data set for which class labels are known to a user, but not known to the initial assignment model, in order to generate the assignment model for prediction, and
if, however, an acceptance criteria is not met by the initial assignment model, features and model parameters are adjusted and a new model is trained.

9. A computer system for assigning a sales opportunity, comprising:
a memory storing computer executable instructions;
a processor executing the instructions and configured to:
obtaining historical data for prediction of a number of an event type;
creating an assignment model for prediction based on clustering the historical data for prediction of the number of the event type, said clustering comprising segregating the historical data to create homogenous data sets for each of a plurality of agents for the event type;
providing a scoring mechanism on the plurality of agents for automatically optimizing an assignment of at least one prediction of an occurrence of the event type to at least one of said plurality of agents, said scoring mechanism comprising a success probability for each of the plurality of agents with respect to each of the at least one prediction of the event type;
matching a new prediction of the event type with one of said clusters;
assigning an agent to said new sales opportunity based on said scoring mechanism;
displaying on a display device a result including the assigning from the scoring mechanism,
wherein said creating an assignment model further comprises:
building a classifier for each of said homogeneous data segments, and
dividing said historical data into a training data set and a testing data set,
wherein said training data set is used to train said classifier to create an initial assignment model,
wherein said testing data set is used to test said initial assignment model to create said assignment model, and
wherein the assignment model for prediction is self-adaptive.

10. The computer system according to claim 9, further comprising:
an assignment model application unit that applies said assignment model to a data set to obtain the success probability for each of said at least one agent;
an assignment model creating unit configured for said creating of the assignment model;
an assignment model application unit configured for predicting a success probability for each of the plurality of agent including the providing of the scoring mechanism and the matching of the new prediction of the event; and
an assignment optimization unit configured for the assigning of the agent to said new sales opportunity based on the scoring mechanism.

11. The computer system according to claim 10, further comprising:
an assignment optimization unit that optimizes the assignment of said at least one prediction of the event type to said at least one agent based on said success probability obtained for each said at least one agent.

12. The computer system according to claim 9, wherein said creating unit comprises:
a training unit that trains a classifier using a training set of data to generate an initial assignment model; and
a testing unit that tests said initial assignment model using a testing set of data to generate said assignment model.

13. A non-transitory tangible computer-readable storage medium tangibly embodying a program of machine readable instructions executable by a digital processing apparatus performing the computer-implemented method of assigning the prediction event according to claim 1.

14. A method of deploying computing infrastructure, comprising integrating computer-readable code stored in a non-transitory computer readable medium into a computing system, wherein the computer readable code in combination with the computing system performs the computer-implemented method of assigning the prediction event according to claim 1.

15. A computer-implemented method of assigning an opportunity to an agent, comprising:
configuring a processor to create an assignment model for prediction including at least one prediction class based on clustering historical prediction event into clusters, said clustering comprising segregating the historical prediction event data to create homogenous data sets for each of a plurality of agents;
comparing, by a computer including the processor, a characteristic of the opportunity with a characteristic of each of the at least one opportunity class to match the opportunity to a prediction class having a similar characteristic;
determining, by the computer, a scoring mechanism comprising a success probability of at least one agent using the assignment model;
assigning the at least one opportunity to one of the at least one agent;
matching, by the computer, a new prediction event with one of said clusters;
assigning an agent to said new sales opportunity based on said scoring mechanism in the computer; and
displaying on a display device a result including the assigning from the scoring mechanism,
wherein said creating an assignment model further comprises:
building a classifier for each of said homogeneous data segments, and
dividing said historical data into a training set and a testing data set,
wherein said training data set is used to train said classifier to create an initial assignment model,
wherein said testing data set is s to test said initial assignment model to create said assignment model, and
wherein the assignment model for prediction is self-adaptive.

16. A tangible non-transitory computer-readable storage medium tangibly embodying a program of machine readable instructions executable by a digital processing apparatus performing the computer-implemented method of assigning the prediction event to the agent according to claim 15.

17. A computer system for assigning predicted event, comprising:
a processor configured to:
obtain historical prediction event data;
create an assignment model for prediction based on clustering a number of historical data for the predicted events, said clustering comprising segregating the historical data to create homogenous data sets for each of a plurality of agents;

provide a scoring mechanism on the plurality of agents for automatically optimizing an assignment of at least one prediction event to at least one of said plurality of agents, said scoring mechanism comprising a success probability for each of the plurality of agents with respect to each of the at least one prediction event;

matching a new prediction event with one of said clusters; and assigning an agent to said new prediction event based on said scoring mechanism;

a user interface for interacting with a display device permitting information of the assignment model to be viewed by a user; and displaying on the display device a result including the assigning from the scoring mechanism, wherein said creating an assignment model further comprises:

building a classifier for each of said homogeneous data segments, and dividing said historical data into a training data set and a testing data set, wherein said training data set is used to train said classifier to create an initial assignment model, wherein said testing data set is used to test said initial assignment model to create said assignment model, and wherein the assignment model for prediction is self-adaptive such that when a type of data inputted changes, the assignment model created is not altered.

* * * * *